United States Patent [19]

Fawley et al.

[11] Patent Number: 5,683,530

[45] Date of Patent: Nov. 4, 1997

[54] REINFORCEMENT METHODS UTILIZING HIGH TENSILE STRENGTH COMPOSITE BANDS

[75] Inventors: Norman C. Fawley, Long Beach; Gordon Tipton, Lakewood; Justin Schmidt, Seal Beach, all of Calif.

[73] Assignee: Clock Spring Company, L.P., Long Beach, Calif.

[21] Appl. No.: 460,430

[22] Filed: Jun. 2, 1995

Related U.S. Application Data

[62] Division of Ser. No. 298,367, Aug. 30, 1994, Pat. No. 5,518,568, which is a continuation of Ser. No. 942,624, Sep. 9, 1992, abandoned.

[51] Int. Cl.$^6$ .............................. B32B 35/00; F16L 55/16
[52] U.S. Cl. ................... 156/94; 29/402.01; 29/402.02; 29/402.09; 156/71; 264/36
[58] Field of Search ........................... 156/71, 94, 172, 156/169, 173, 175, 184, 289; 138/172; 264/136, 36; 29/402.09, 402.02, 402.01

[56] References Cited

U.S. PATENT DOCUMENTS

| 2,026,133 | 12/1935 | Mapes . |
| 2,161,036 | 6/1939 | Gremmel et al. . |
| 2,280,501 | 4/1942 | Stephenson . |

(List continued on next page.)

FOREIGN PATENT DOCUMENTS

| 1169790 | 6/1984 | Canada . |
| 2028524 | 3/1991 | Canada . |
| 1441653 | 5/1966 | France . |
| 272629 | 10/1989 | Germany . |
| 3863077 | 3/1977 | Japan . |
| 5238630 | 3/1977 | Japan . |
| 5539444 | 3/1980 | Japan . |
| 60-181136 | 9/1985 | Japan . |
| 1314179 | 5/1987 | U.S.S.R. . |
| 1707423 | 1/1992 | U.S.S.R. . |
| 455938 | 10/1936 | United Kingdom . |
| 1013039 | 12/1965 | United Kingdom . |
| 1025319 | 4/1966 | United Kingdom . |
| 15327651 | 11/1978 | United Kingdom . |

OTHER PUBLICATIONS

News Release –"Panhandle Eastern Corporation Using New Pipeline Repair Technology"–Dec. 7, 1989 (pp. 1–4).
"Pipeline Repair Process and Installation of Clock Spring Reinforcement", Gibbs–Ellison, date unknown, pp. 1–31.
Gibbs–Ellison video of Cuero Installation on Oct. 10, 1989, date unknown.
Federal Register, vol. 57, No. 240, Dec. 14, 1992, pp. 59199–59200.
Federal Register, vol. 58, No. 48, Mar. 15, 1993, p. 13824.
Internal MAPCO memorandum from Douglas Lee regarding Clock Spring Pipeline Reinforcement, Mar. 23, 1990, one page.
"Tests of Clock Spring as a Means of Pipeline Repair", Kiefner, Fawley and Lee, unpublished, pp. 1–13.

(List continued on next page.)

*Primary Examiner*—Jeff H. Aftergut
*Attorney, Agent, or Firm*—Lerner, David, Littenberg, Krumholz & Mentlik

[57] ABSTRACT

Axially extending structures having internal forces directed radially outward therefrom may be reinforced by installing bands around the structures. The bands consist of a plurality of elastic convolutions of a composite material which assume a coiled configuration in a relaxed condition. The composite material includes a multiplicity of continuous, high tensile strength filaments encapsulated in a resin matrix and extending codirectionally with one another through the resin matrix. The band is installed around the structure by deflecting portions of the band to an uncoiled configuration and then wrapping these portions of the band around the structure. Adhesive may be used to secure the band tightly around the structure. Particularly useful applications for the composite bands are for reinforcing gas and liquid transmission pipelines and concrete bridge support columns.

8 Claims, 8 Drawing Sheets

U.S. PATENT DOCUMENTS

| | | |
|---|---|---|
| 2,401,092 | 5/1946 | Miller et al. . |
| 2,713,551 | 7/1955 | Kennedy . |
| 2,718,583 | 9/1955 | Noland et al. . |
| 2,824,033 | 2/1958 | Donaldson . |
| 2,857,932 | 10/1958 | Calderwood . |
| 2,924,546 | 2/1960 | Shaw . |
| 3,096,105 | 7/1963 | Risley . |
| 3,184,092 | 5/1965 | George . |
| 3,240,644 | 3/1966 | Wolff . |
| 3,321,924 | 5/1967 | Liddell . |
| 3,349,807 | 10/1967 | Penman . |
| 3,358,898 | 12/1967 | Medkeff et al. . |
| 3,439,405 | 4/1969 | Berman et al. . |
| 3,457,963 | 7/1969 | Hardwick . |
| 3,480,499 | 11/1969 | Paul, Jr. . |
| 3,483,896 | 12/1969 | Grosh . |
| 3,486,655 | 12/1969 | Ragettli . |
| 3,502,529 | 3/1970 | Borgnolo et al. . |
| 3,602,416 | 8/1971 | Basche et al. . |
| 3,631,897 | 1/1972 | Fischer et al. . |
| 3,686,048 | 8/1972 | Schirtzinger ......................... 156/161 |
| 3,687,762 | 8/1972 | McLarty . |
| 3,698,746 | 10/1972 | Loncaric . |
| 3,737,352 | 6/1973 | Avis et al. . |
| 3,757,829 | 9/1973 | Berry et al. . |
| 3,768,269 | 10/1973 | Broussard et al. . |
| 3,784,441 | 1/1974 | Kaempen . |
| 3,815,773 | 6/1974 | Duvall et al. . |
| 3,843,010 | 10/1974 | Morse et al. . |
| 3,844,822 | 10/1974 | Boss et al. . |
| 3,860,039 | 1/1975 | Ellis . |
| 3,860,043 | 1/1975 | Kutnyak et al. . |
| 3,870,350 | 3/1975 | Loncaric . |
| 3,873,139 | 3/1975 | McCabe . |
| 3,880,195 | 4/1975 | Goodrich et al. . |
| 3,900,048 | 8/1975 | Isham et al. . |
| 3,939,874 | 2/1976 | Gray . |
| 3,969,812 | 7/1976 | Beck . |
| 3,977,614 | 8/1976 | Hardwick . |
| 4,001,054 | 1/1977 | Makepeace . |
| 4,014,370 | 3/1977 | McNulty . |
| 4,081,303 | 3/1978 | Rogers et al. . |
| 4,106,528 | 8/1978 | Laing . |
| 4,144,125 | 3/1979 | Maritsch . |
| 4,148,127 | 4/1979 | Somerville . |
| 4,176,691 | 12/1979 | Jude et al. . |
| 4,180,104 | 12/1979 | Park et al. . |
| 4,181,157 | 1/1980 | DeCamp . |
| 4,195,669 | 4/1980 | Ives et al. . |
| 4,214,932 | 7/1980 | Van Auken . |
| 4,224,966 | 9/1980 | Somerville . |
| 4,289,172 | 9/1981 | Ekstrom . |
| 4,340,090 | 7/1982 | Matsushita et al. . |
| 4,383,556 | 5/1983 | Evgenievich et al. . |
| 4,391,301 | 7/1983 | Pflederer . |
| 4,464,216 | 8/1984 | Gardiner . |
| 4,514,245 | 4/1985 | Chabrier . |
| 4,559,974 | 12/1985 | Fawley . |
| 4,589,562 | 5/1986 | Fawley . |
| 4,676,276 | 6/1987 | Fawley . |
| 4,700,752 | 10/1987 | Fawley . |
| 4,753,847 | 6/1988 | Wilheim et al. . |
| 4,919,739 | 4/1990 | Dyksterhouse et al. . |
| 5,043,033 | 8/1991 | Fyfe ......................... 156/71 |
| 5,055,242 | 10/1991 | Vane ......................... 156/148 X |
| 5,447,593 | 9/1995 | Tanaka et al. ......................... 156/71 |

OTHER PUBLICATIONS

Letter from Norm Fawley to Lawrence Postier, May 7, 1990, one page.

"Repair/Reinforcement Technology Strengthens Pipe at Low Cost", *Grid*, Fall 1989, pp. 42–43.

"Composite–Reinforced Technology –Products for the Pipe-line Industry", date unknown, but prior to Feb., 1988, pp. 1–6.

Tocci, Lisa, "Building a Better Pipe", *American Gas*, vol. 73, No. 8, Aug. 1991, cover, pp. 1–5.

"A New Family of Composite Products Stops Cracks in Line Pipe, Extends Life of Pipeline, Improves Safety", *Reinforcement Digest*, No. 46, Jan. 1989, cover, pp. 2–5.

"New Technologies for Transmission and Storage Operations", Gas Research Institute, date unknown, pp. 1–4.

"New Pipeline Crack–Arresting Techniques Succesfully Tested", *Grid*, Winter 1987/1988, cover, pp. 1 and 27–28.

"Applications of Clock Spring", NCF Industries, date unknown, pp. 1–4.

"Instructions for Clock Spring Installation", Clock Spring Company North America, L.P., Feb. 1991, pp. 1–5.

"Pipeline Reinforcement", NCF Industries, Nov. 10, 1987, pp. 1–4.

NCF Industries' Report on Panhandle Eastern Tests, Oct. 2, 1989, pp. 1–16.

"Final Report on Observations on Tests and Recommendations of the Use of Clock Spring Devices for Repair of Corrosion in Pipelines", Vieth and Kiefner, May 22, 1992, pp. 1–32.

NCF Industries' Report on Clock Spring Pipe Reinforcement Tests, Jul. 25, 1989, pp. 1–16.

Rosato, D.V., et al., "Filament Winding: Its Development, Manufacture, Applications and Design", 1964, pp. 103–109.

FIG. 1a
(PRIOR ART)
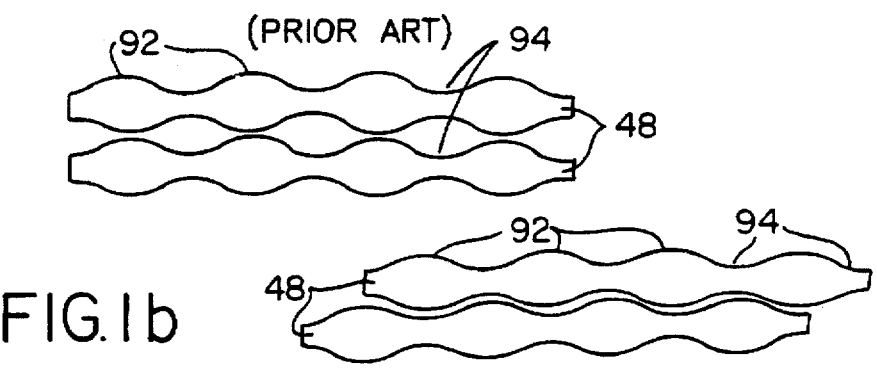
FIG. 1b
FIG. 2
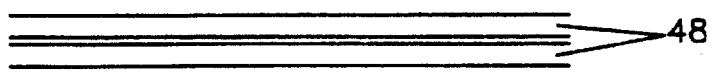
FIG. 5
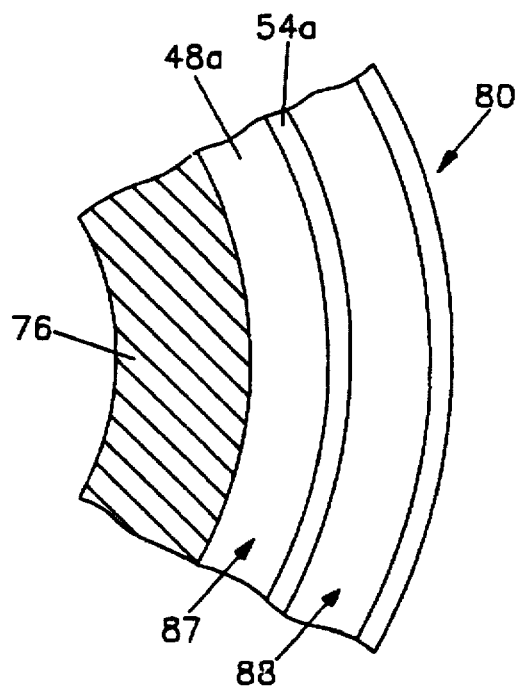

REINFORCEMENT METHODS UTILIZING HIGH TENSILE STRENGTH COMPOSITE BANDS

This is a division of application Ser. No. 08/298,367, filed on Aug. 30, 1994, now U.S. Pat. No. 5,518,568, which is a File Wrapper Continuation of prior application Ser. No. 07/942,624 as originally filed on Sep. 9, 1992, now abandoned.

FIELD OF THE INVENTION

The present invention relates to the field of composite materials. More particularly, the present invention relates to reinforcing bands formed in the form of a spiral from composite materials and methods for making the same.

BACKGROUND OF THE INVENTION

Extensive pipeline systems exist for carrying gas or liquid under pressure over long distances. These pipelines are subject to corrosion and, under certain conditions, are subject to failure by the generation of a crack running in the axial direction of the pipeline at high speeds and with tremendous force. Over the years, methods have been developed for repairing corroded portions of a pipeline and for limiting ductile and brittle fracture propagation in such pipelines. One such method involves the application of a coiled band of a high tensile strength composite material around the pipeline. Methods employing these composite bands for repairing and reinforcing a pipeline are described in published Canadian Patent Application No. 2,028,524, and methods employing these composite bands as a crack arrester to limit ductile fracture propagation in a pipeline are described in U.S. Pat. No. 4,700,752. The disclosures of both of these documents are incorporated by reference herein.

The composite bands employed in the above-noted methods consist of continuous fibers of a high tensile strength material encapsulated in a resin matrix. The processes utilized heretofore for manufacturing these composite bands have suffered from various drawbacks. In one such process, the high tensile strength fibers were provided in the form of a tape having multiple cross threads holding the fibers together, the cross threads being held in place by strips of a hot-melt glue. One difficulty associated with the use of such tapes has been an inability to consistently surround and encapsulate the fibers with a resin coating. Another problem with processes employing these tapes is that the heat associated with the gelling and curing of the resin causes the strips of hot-melt glue to melt, leaving voids which extend across the composite band. These voids act as channels enabling water to penetrate and attack the fibers, thereby causing the bands to weaken over time.

In order to overcome some of these difficulties, the inventors herein have experimented with processes employing individual fibers which are not connected by cross threads. The experimental processes employing individual fibers which have been attempted heretofore, however, have produced bands having undulating inner and outer surfaces. That is, tension in the continuous fibers during the manufacturing process has caused these bands to have a random series of peaks and valleys which extend on each surface in the length direction of the band. The peaks and valleys on adjacent convolutions of the composite band interfere with one another when it is desired to radially align the convolutions during installation, thereby making the installation process more difficult.

Another problem associated with these experimental composite bands relates to the intended function of the band as a reinforcement for structures. Typically, during the installation of composite bands around, for example, pipelines, an adhesive is applied between adjacent convolutions of the band as the band is wound around the pipeline. This adhesive is intended to keep the band from uncoiling under the very high fluid pressures at which these pipelines normally operate. However, some problems relating to the use of these adhesives have been experienced as these bands have been installed on simulated pipelines for testing purposes. These problems include difficulties in developing adequate adhesive strength between adjacent convolutions of the band on a consistent basis and in achieving a sufficiently rapid and consistent adhesive cure rate. A further problem has been an inability to obtain very thin and uniform layers of adhesive to minimize "cushioning" affects caused by the adhesive layers between adjacent convolutions of the band.

There therefore exists a need for improved processes for fabricating high tensile strength composite bands incorporating continuous high tensile strength fibers in a resin matrix. There further exists a need for methods for regularly developing strong adhesive bonds between adjacent convolutions of these bands as the bands are installed to reinforce a structure.

SUMMARY OF THE INVENTION

The present invention addresses these needs.

It has been discovered that the inconsistent bond strength between the convolutions of the experimental composite bands incorporating individual fibers stem not from the adhesive which is applied during installation of these bands around a structure, but rather from the undulating surface finish with which these composite bands have been formed. When the band is installed, the peaks and valleys in adjacent layers may be aligned in different ways. In one case, the confronting surfaces on adjacent layers may be "in phase" whereby the peaks on one layer mesh with the valleys on the adjacent layer so that there is continuous contact between the confronting surfaces of these layers. In another case, the surfaces may be "out of phase", the peaks on one layer being aligned with the peaks on the adjacent layer so that the confronting surfaces of these layers contact one another only at the peaks while there are substantial distances between these surfaces in the vicinity of the valleys. Since the peaks and valleys are randomly disposed on each layer, it is highly unlikely that all of the peaks and valleys on one surface will be either in phase or out of phase with all of the peaks and valleys on the confronting surface. More likely will be a condition in which some of the peaks and valleys on the confronting surfaces are in phase, others are out of phase, and still others are somewhere between entirely in phase or entirely out of phase.

Since the strength of adhesive bonds is inversely proportional to the thickness of the adhesive layer, the strength of the adhesive bond between adjacent convolutions of the composite band will depend to a large extent upon the distance between the confronting surfaces of adjacent convolutions—the closer the surfaces are to one another, the stronger the bond; and the more distant the surfaces are from one another, the weaker the bond. By practicing the methods of the present invention, composite bands incorporating individual fibers can now be manufactured with flat surfaces so that adjacent convolutions of the band may be in substantially continuous contact with one another over their entire surfaces. Accordingly, these composite bands can now be consistently installed with thin layers of adhesive between adjacent convolutions so that strong adhesive bonds are developed. These thin layers of adhesive also allow for consistently rapid adhesive cure rates and minimize the cushioning affect attributable to the application of adhesive between adjacent convolutions of the band. Additionally, the elimination of the peaks and valleys from these bands makes it much easier for the plurality of convolutions of the bands to be radially aligned during installation.

Another benefit of the processes of the present invention is that it is now possible on a regular basis to completely coat and encapsulate the high tensile strength fibers within the resin matrix without forming any voids or channels in the composite. The resin will thus function to protect the embedded fibers from the mechanical and chemical deterioration which could potentially occur upon exposure to the environment. Moreover, the processes of the present invention enable high quality composite bands to be manufactured with larger percentages of fibers so that composite bands of superior strength are formed.

One aspect of the present invention provides a method of making a spiral band having a plurality of convolutions of a high tensile strength composite material. A method according to this aspect of the invention includes the step of feeding a multiplicity of continuous, high tensile strength fibers through a bath of a resin in an uncured fluid state so that the fibers become entirely coated by the resin to form a continuous web of the composite material. The composite web is placed against semi-rigid release web means having at least one flat surface so that at least one of the surfaces of the web is in intimate contact with the release web means to form a laminate. The laminate is wound around a mandrel to form a plurality of overlapping convolutions of the composite material and the resin in the web is at least partially cured to a solid state to set the convolutions in a spiral configuration. As the release web means is removed from the composite web, a web having at least one substantially flat surface will be revealed.

Preferably, the release web means is sufficiently rigid that the at least one flat surface of the release web means is not deformed by the fibers in the composite web during the winding and curing steps, yet is sufficiently flexible to uniformly wrap around the mandrel during the winding step. The release web means may have at least two substantially flat surfaces so that each of the first and second sides of the composite web in the plurality of overlapping convolutions is in contact with one flat surface of the release web means. Although the rigidity of the release web means will depend to a large extent on the particular material from which the release web means is formed, preferred release web means may have a thickness of at least about 0.005 inches. Although the release web means can be formed from any sheet material having an appropriate degree of rigidity, polypropylene, nylon and mylar release webs are particularly preferred.

The high tensile strength fibers for forming the composite material are preferably formed from a nonmetallic and electrically non-conductive material. For example, the fibers may be glass fibers, and preferably E-type glass fibers. Desirably, the fibers are individual fibers having a diameter of less than about 0.001 inches. As used herein, the term "individual" refers to the fact that the fibers are independent of one another and do not include any cross threads or other connecting members which may hold a number of the fibers together. The fibers may be provided in the form of fiber bundles, each fiber bundle including a plurality of individual fibers. In such case, it is desirable to wind the fiber bundles through a series of breaker bars to spread out and separate the individual fibers in the bundles before they enter the resin bath.

The resin for forming the composite material is preferably elastic in the cured solid state, and may be selected from the group consisting of polyester resins, vinyl ester resins, polyurethane resins, epoxy resins, asphalt enamel, coal tar enamel, and similar materials. Of these resins, polyester resins, vinyl ester resins, polyurethane resins and epoxy resins are preferred, with isophthalic polyester resin being particularly preferred. Preferred composites will include between about 50 wt % and about 90 wt % of the fibers and between about 10 wt % and about 50 wt % of the resin; more preferably between about 65 wt % and about 75 wt % of the fibers and between about 25 wt % and about 35 wt % of the resin; and most preferably about 70 wt % of the fibers and about 30 wt % of the resin.

The step of feeding the fibers through the resin bath may include the step of passing the fibers beneath a bar positioned within the resin to sharply change the direction of travel of the fibers, thereby further spreading out and separating the fibers from one another so that they become more completely coated by the resin. The fibers may be tensioned before they are fed through the resin bath. Tensioning may be accomplished by winding the fibers through a series of breaker bars to put a drag on the forward movement of the fibers into the resin bath. The foregoing process provides a simple and effective way to form composite bands in the form of a spiral having high tensile strength in the spiral direction.

Another aspect of the present invention provides a method of reinforcing an axially extending structure against an internal force directed radially outward from the structure. A method according to this aspect of the invention includes the step of providing a spiral band having a plurality of convolutions of a high tensile strength composite material, each one of the convolutions having at least one substantially flat surface. The plurality of convolutions of the spiral band are wrapped about the structure using an adhesive keep the plurality of convolutions from moving with respect to one another and with respect to the structure.

BRIEF DESCRIPTION OF THE DRAWINGS

A more complete appreciation of the subject matter of the present invention and the various advantages thereof can be realized by reference to the following detailed description, in which reference is made to the accompanying drawings in which:

FIG. 1a is an enlarged schematic transverse cross-sectional view taken through adjacent convolutions of an experimental spiral band in one installation position;

FIG. 1b is an enlarged schematic transverse cross-sectional view taken through adjacent convolutions of the experimental spiral band of FIG. 1a in another installation position;

FIG. 2 is an enlarged schematic transverse cross-sectional view taken through adjacent convolutions of a spiral band in accordance with the present invention;

FIG. 5 is an enlarged partial cross-sectional view schematically showing adjacent convolutions of a spiral band during the forming process;

DETAILED DESCRIPTION OF THE PREFERRED EMBODIMENTS

Processes according to the present invention utilize continuous fibers formed from a lightweight, high tensile strength material. Although fibers formed from any material having a high tensile strength may be used, it is generally preferred that the fibers be nonmetallic and electrically non-conductive. In this regard, glass fibers are preferred, with E-type glass fibers being particularly preferred due to their relatively low cost. However, the present invention contemplates the use of fibers formed from other high tensile strength materials, such as, for example, S-type glasses, R-type glasses and Kevlar. The fibers are provided in the form of individual fibers which are independent of one another. That is, the fibers do not include any cross threads, any hot-melt glues or any other connecting members which may hold a number of the fibers together. Desirably, each individual fiber has a diameter of less than about 0.001 inches. The fibers may be provided in the form of bundles, with each fiber bundle being independent of the next and including hundreds or even thousands of individual fibers.

Figure 4:
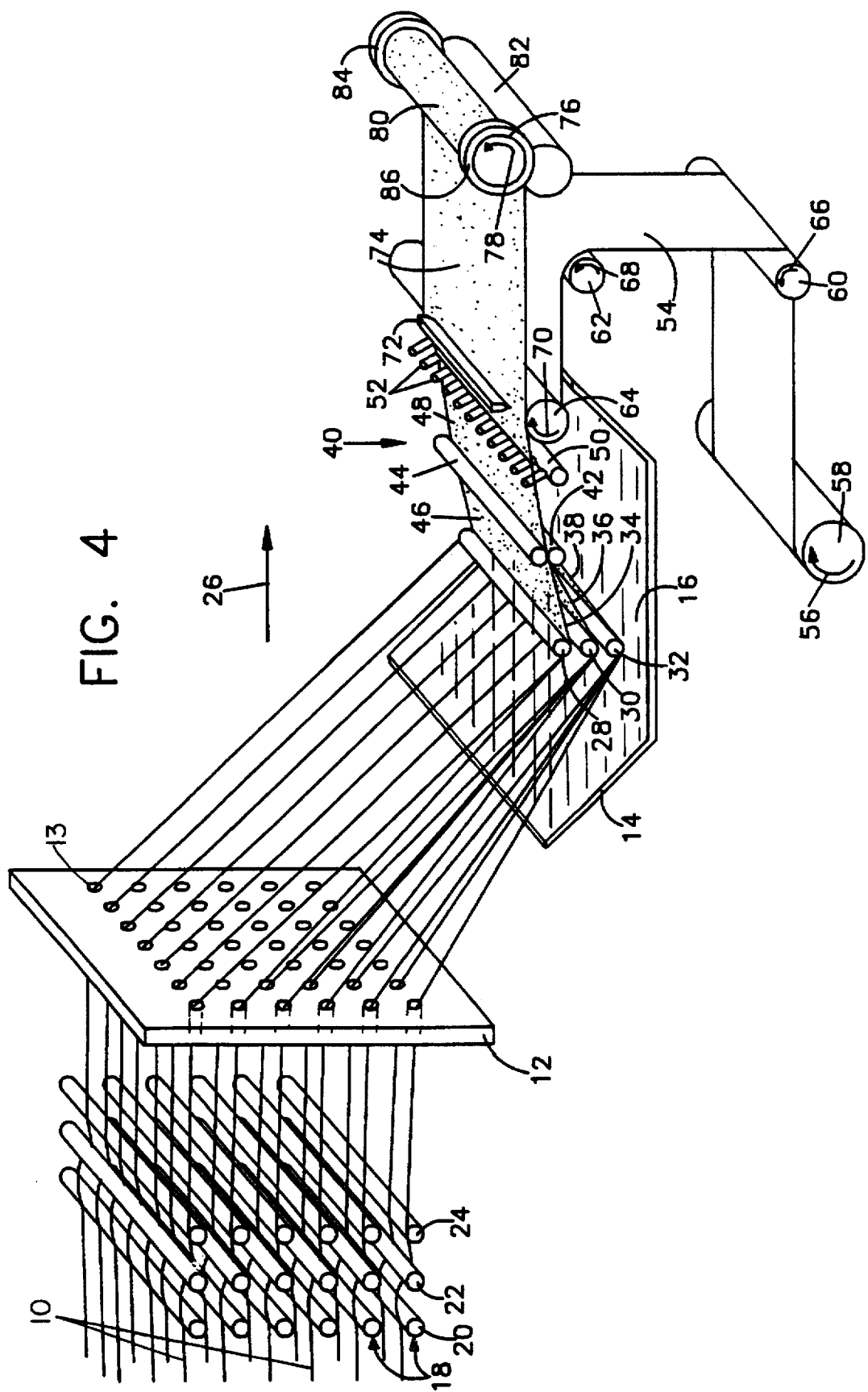
FIG. 4 is a diagrammatic view showing a process for forming a spiral band in accordance with one embodiment of the present invention.

Referring to FIG. 4, a plurality of fiber bundles 10 are drawn from packages (not shown) through a guiding device 12 having a plurality of feed eyes 13 which guide the fiber bundles 10 so that they do not become entangled with one another and so that they are properly aligned in generally the same direction for further processing. The number of fiber bundles 10 provided will depend upon the width and thickness of the spiral band being produced, as well as the fiber/resin ratio desired in the band.

From the guiding device 12, the fiber bundles 10 are drawn through a bath 14 containing a resin 16. Several criteria must be considered in selecting an appropriate resin for use in the present invention. A suitable resin preferably will have an uncured state in which it is sufficiently fluid that it can be applied to fully coat the individual fibers in fiber bundles 10, yet viscous enough that it will fill and remain in the interstitial spaces between the fibers. Such resin preferably will also be capable of achieving a cured solid state in which it will exhibit an elastic memory. By adjusting the amount of catalyst added to the resin, the time required for the resin to cure to the solid state can be controlled so that the various forming steps described hereinbelow can be performed while the resin is still in an uncured fluid state.

Another factor to be considered during resin selection is the ability of the resin in the cured state to protect the embedded fibers from chemical and mechanical damage. In that regard, during the use of the spiral bands formed from the composite material to reinforce a structure, the fibers within the spiral band will generally be the primary load-carrying members. Accordingly, it is preferable that the resin in the cured state have sufficient strength, as well as resistance to degradation from moisture, the chemical activity of soil and other environmental activity, to prevent the fibers from becoming damaged and weakened.

Also preferred are resins having a ductility and elongation in the cured state which are compatible with the ductility and elongation of the fibers. If the ductility and elongation of the fibers and resin are significantly different, the tensile stress applied to a spiral band during use as a reinforcement will create a shear force at the interface between the fibers and the resin which may break the interfacial bond between these components. As this bond is broken, aggressive media such as acids and alkalis in the air and soil will be able to advance rapidly along the fibers, subjecting same to deterioration and weakening. By matching the ductility and elongation of the resin as closely as possible to that of the fibers, the shear force at the interface will be minimized and, hence, the potential for disbonding between the resin and the fibers will be reduced.

Considering the foregoing criteria, suitable resins for use in the present invention may be selected from the group consisting of polyester resins, vinyl ester resins, polyurethane resins, epoxy resins, asphalt enamel and coal tar enamel. Of these materials, polyester resins, vinyl ester resins, polyurethane resins and epoxy resins are preferred. Other materials having similar properties to the foregoing materials and satisfying the requirements discussed above may also be used. A particularly preferred resin is an isophthalic polyester resin consisting of an isophthalic polyester base component and a methyl ethyl ketone peroxide catalyst for gelling and curing the resin to the solid state. Other than the catalyst, various conventional ingredients may be added to the resin in order to obtain particularly desirable properties. These additives may include, for instance, agents for protecting the resin from ultraviolet radiation, viscosity controlling agents, pigments for coloring the resin for visibility or identification purposes, and the like.

Before passing through guiding device 12, the fiber bundles 10 may be fed through a series of breaker bars or redirect bars 18. Each series 18 includes three bars 20, 22 and 24 spaced from one another in a horizontal plane, there being a separate series of bars 18 for each row of feed eyes 13 in guiding device 12. Thus, one group of fiber bundles 10 may be fed over bar 20, under bar 22, and over bar 24 in the uppermost series of bars 18, and then through the top row of feed eyes 13 in guiding device 12. The remaining fiber bundles 10 may similarly be fed around bars 20, 22 and 24 in the remaining series of bars 18 and then through the respective rows of feed eyes 13. Redirect bars 18 serve a dual purpose. Firstly, as the fiber bundles 10 travel around bars 20, 22 and 24, they will be initially separated and spread out into relatively thin layers of individual fibers. Further, redirect bars 18, in cooperation with the downstream processing steps described hereinbelow, will exert a drag on fiber bundles 10 to restrict the movement of the fiber bundles in the overall process direction, shown by arrow 26. This drag will cause the fibers downstream of redirect bars 18 to be in tension, thereby eliminating any waviness in the fibers so that the fibers are aligned in essentially parallel straight lines as they pass through resin bath 14. As will be appreciated from the discussion below, placing excessive tension on the fibers may result in the formation of spiral bands of poor quality. By adjusting the horizontal spacing between bars 20, 22 and 24 in each series 18, the tension exerted on the fibers can be adjusted—the closer the bars are to one another, the greater the tension in the fibers, and the farther the bars are from one another, the lower the tension in the fibers.

Exiting guiding device 12, the fiber bundles 10 converge toward one another as they enter resin bath 14. Once within resin bath 14, the fiber bundles 10 are fed beneath one of a series of spreader bars 28, 30 and 32 arranged in a ladder configuration below the surface of the resin 16. That is, one portion of fiber bundles 10, such as those feeding through the top two rows of feed eyes 13, will pass under spreader bar 28; another portion of fiber bundles 10, such as those feeding through the middle two rows of feed eyes 13, will pass under spreader bar 30; and a final portion of fiber bundles 10, such as those feeding through the bottom two rows of feed eyes 13, will pass under spreader bar 32. As the fiber bundles 10 pass below spreader bars 28, 30 and 32, respectively, they will undergo a dramatic change in direction of travel and will be further separated and spread out from one another so that the resin 16 can more easily penetrate between the individual fibers and saturate the fiber bundles. Further, spreader bars 28, 30 and 32 assure that the fibers travel through the resin 16, and do not merely float on the surface of same.

After they pass under spreader bars 28, 30 and 32, respectively, the resin-coated fibers will be in the form of composite webs 34, 36 and 38, each consisting of a multiplicity of continuous fibers extending substantially codirectionally with respect to one another through a resin matrix. As they are drawn out from resin bath 14, webs 34, 36 and 38 are simultaneously drawn through a squeegee arrangement 40 comprising a fixed lower bar 42 and a weighted upper bar 44 which is hingedly connected to a frame (not shown) so that bar 44 is freely floating. As the composite webs 34, 36 and 38 pass through the nip 46 defined between bars 42 and 44, the squeezing action of the weighted bar 44 will force the resin 26 between the individual fibers to increase the likelihood that the fiber bundles are saturated with resin. Excess resin will be squeezed out from the webs and the individual webs will be consolidated into a single composite web 48. Web 48 may be pulled through a combing device 50 which includes an elongated bar extending generally perpendicular to the direction of travel of web 48 and a plurality of upwardly extending fingers 52 traversing the width of the web. By feeding a substantially equal number of the continuous fibers between each of fingers 52, combing device 50 assures that the fibers are distributed substantially evenly throughout the width of composite web 48.

Advancing beyond combing device 50, the web 48 contacts and is deposited upon a continuous web 54 of a release material being fed in the direction of arrow 56 from a spool 58, and around idler rollers 60, 62 and 64 rotating in the direction of arrows 66, 68 and 70, respectively. As it contacts release web 54, composite web 48 travels beneath a squeegee 72 formed from rubber or another pliant material. Squeegee 72 squeezes any excess resin 16 from composite web 48, which resin will then run back into bath 14. The proportion of resin to the fibers in composite web 48 will remain substantially unchanged once the web has passed squeegee 72. The composite web 48 will desirably include between about 50 wt % and about 90 wt % of the fibers and between about 10 wt % and about 50 wt % of the resin; more preferably between about 65 wt % and about 75 wt % of the fibers and between about 25 wt % and about 35 wt % of the resin; and most preferably about 70 wt % of the fibers and about 30 wt % of the resin.

Beyond squeegee 72, the release web 54 and composite web 48 can travel together as a laminate 74 which subsequently will be wound in a plurality of convolutions around mandrel 76, rotating in the direction of arrow 78, to form an assembly 80 consisting of alternating layers of composite web 48 and release web 54 wound in a coiled configuration. A pressure roller 82 may bear against assembly 80 during this winding step to assure that the laminate 74 is wound tightly on the mandrel 76. A layer of release web 54 or a similar release coating may be applied to mandrel 76 prior to the winding step to facilitate the removal of the assembly 80 from the mandrel after the resin has gelled. As the inner diameter of assembly 80 will correspond to the outer diameter of mandrel 76, the diameter size of mandrel 76 will be particularly selected depending upon the minimum inner diameter of the spiral band desired for a particular application. The mandrel 76 will ordinarily have a diameter which is half the diameter of the structure on which the spiral band is eventually to be installed. Desirably, the laminate 74 will be wound between a pair of spaced flange members 84 and 86 formed on mandrel 76 which will thus define the width of the assembly 80.

Once the desirable number of convolutions of laminate 74 have been wound on mandrel 76 (typically between 10 and 20 convolutions), the assembly 80 on mandrel 76 is severed from the remainder of laminate 74 by cutting the laminate transversely to the length direction. The mandrel containing the assembly 80 may then be stored under ambient conditions, during which time the resin 16 in the composite web 48 will partially cure or gel to a solid state, setting the plurality of convolutions in the assembly 80 in the spiral configuration. The length of this gel time will depend upon the amount of catalyst added to the resin base component. Once gelled, the resin can be fully cured by heating the assembly 80, such as in a forced air oven, to a temperature of between about 100° F. and about 250° F. For the preferred isophthalic resins discussed above, a typical heating schedule may consist of a stepped cycle in which assembly 80 is heated at between about 170° F. and about 180° F. for about one hour, and then at about 250° F. for about two hours.

Figure 3:
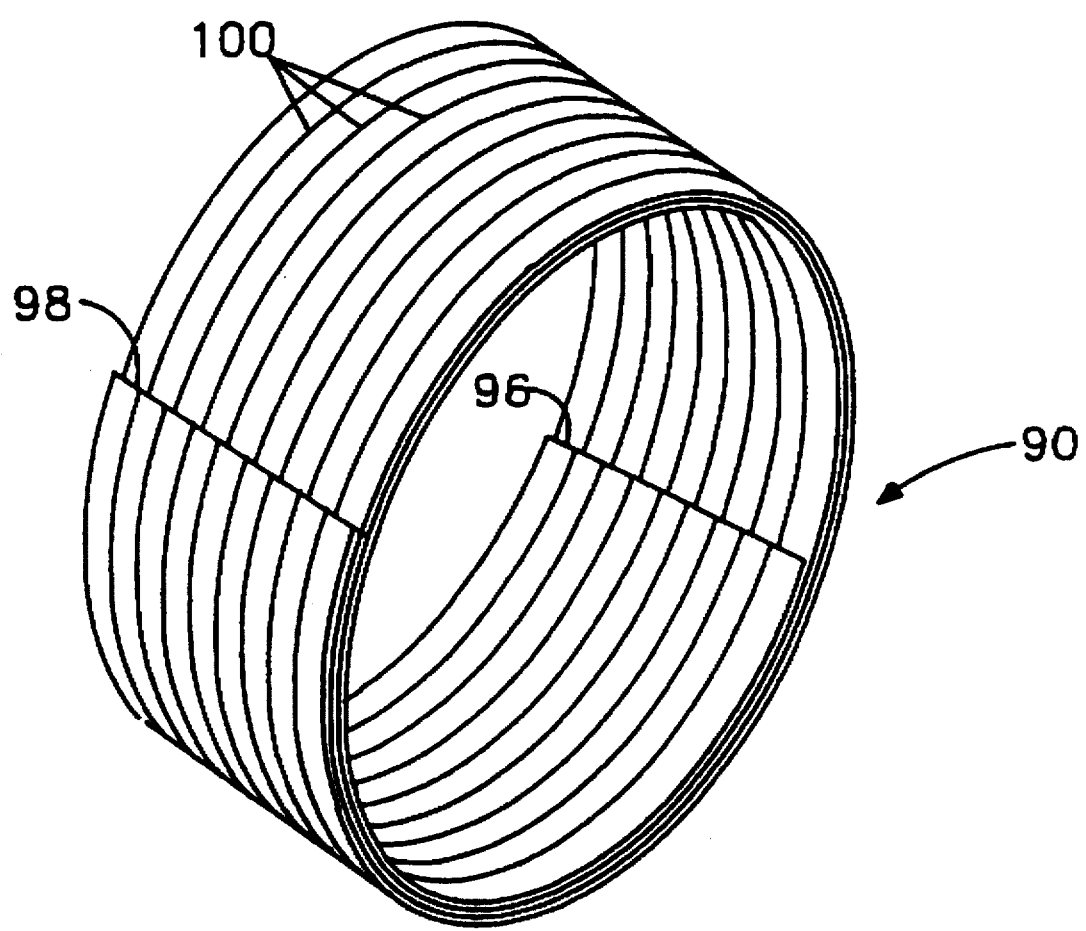
FIG. 3 is a perspective view of a spiral band.

When the resin 16 in the assembly 80 has gelled to a sufficiently solid state that the composite material will not permanently deform, the assembly can be removed from mandrel 76 and the side edges of the assembly, which may constitute regions of resin flash, may be trimmed away, leaving an assembly having a desired width. The trimmed edges of the assembly 80 are then coated with resin 16 and the assembly 80 is processed through the final curing cycle. Once the resin in the assembly has fully cured, the release web 54 can be stripped away, leaving a spiral band 90 having a plurality of convolutions of the composite material, as shown in FIG. 3.

During the step of winding the laminate 74 on mandrel 76, the fiber tension in the length direction of the laminate 74 will typically cause the laminate to be wound tightly such that each convolution of the laminate on the mandrel will be squeezed by subsequent convolutions. Since the resin 16 in the laminate 74 is in the fluid state during this winding process, this squeezing action would typically have a tendency to distort the surfaces of the composite web 48. In other words, referring to FIG. 5, as a result of the tension in the fibers, the fibers will have a tendency to wind tightly around mandrel 76 so that the fibers in convolution 88 of assembly 80 will exert localized forces tending to deform the release web 54a in the previous convolution 87 of the assembly when that release web is formed from an insufficiently rigid material. Since the resin in composite web 48a of convolution 87 at this point is still in an uncured state, the resin will be unable to support release web 54a and prevent its local deformation. Rather, the resin will yield to these forces, resulting in the formation of surface undulations or ripples which extend in the length direction of the composite web 48a of convolution 87. As the winding of laminate 74 around mandrel 76 progresses, each subsequent convolution of the laminate will act in a similar manner to deform the previous convolutions of the laminate. These surface undulations are shown as the "peaks" 92 and "valleys" 94 in the transverse cross-sectional view of two convolutions of a spiral band shown in FIGS. 1a and 1b.

The deformation of the composite web 48 resulting in the formation of surface undulations can be substantially eliminated by the selection of an appropriate release web 54. That is, by selecting a sufficiently rigid release web 54 which will not deform locally during the winding step, the convolutions of the composite web 48 in assembly 80 can be formed with surfaces that are substantially flat in transverse cross-section, as shown in FIG. 2. At the same time, release web 54 must be sufficiently flexible that it will be capable of uniformly wrapping in smoothly curved convolutions around mandrel 76 during the winding step. In that regard, suitable release webs may be formed from mylar, polypropylene, nylon and like materials which will not strongly adhere to the composite web 48 after it has cured, and which will withstand the heat generated by the resin 16 during its gelling stage, as well as the heat applied to assembly 80 during final curing. Of course, the stiffness of the release web will depend upon both the composition of the web and its thickness. For example, when mylar is used as the release web material, the release web will preferably have a thickness of between about 0.005 inches and about 0.010 inches. Further, preferred release webs will have at least one substantially flat surface. As used herein, the term "substantially planar" refers to surfaces of release web 54 and the convolutions of spiral band 90 which, viewed in transverse cross-section, have a surface flatness which deviates by no more than about 1/64 inches per foot. The flat surfaces of highly preferred release webs may also have a textured surface finish.

Figure 6:
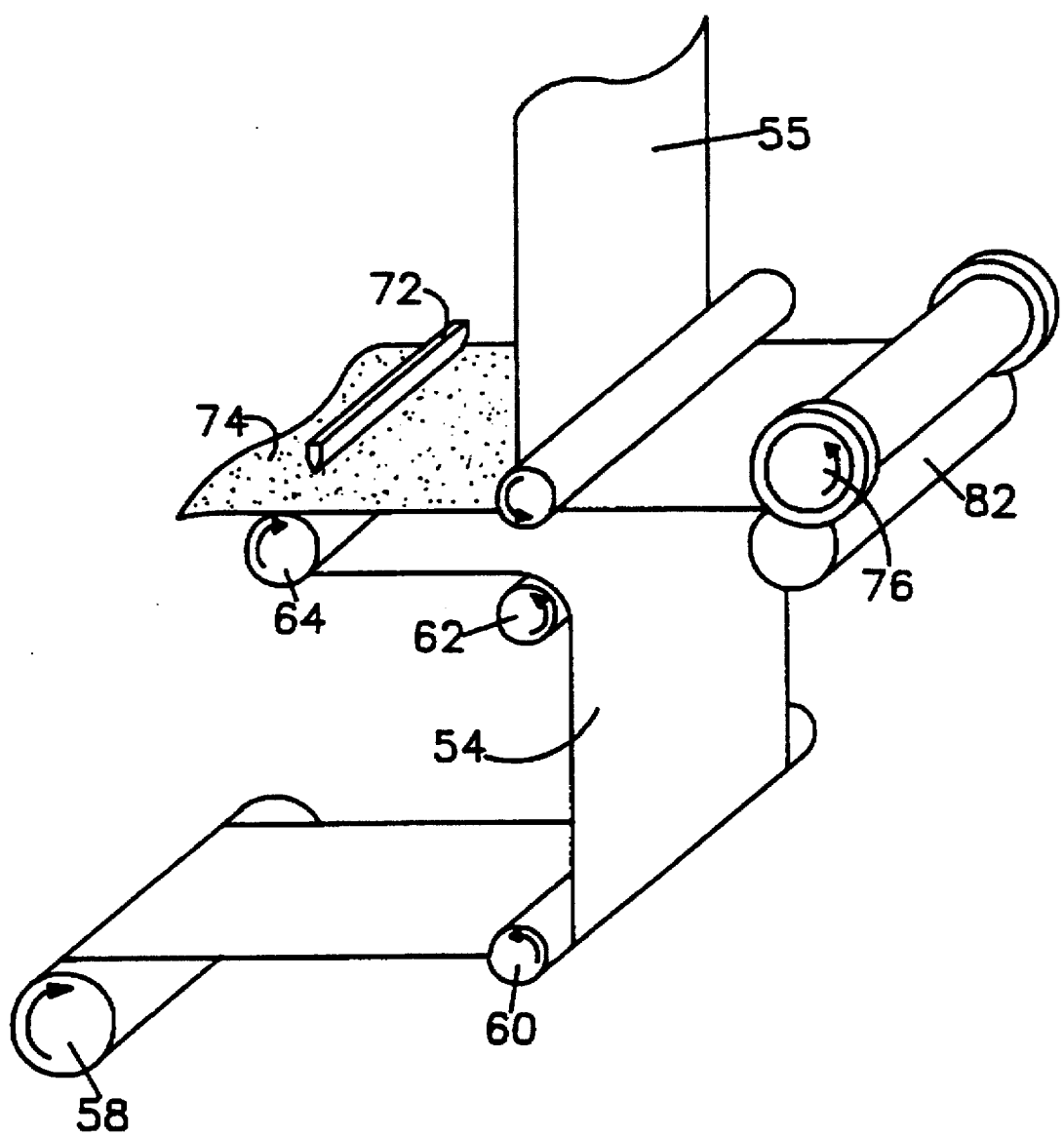
FIG. 6 is a partial diagrammatic view showing a process for winding the spiral band in accordance with an alternate embodiment of the present invention.

During the process of the present invention, the surface of composite web 48 will generally conform to the flatness and surface texture of that surface of release web 54 with which it is in contact. Accordingly, it is desirable that the step of winding laminate 74 about mandrel 76 be arranged so that both surfaces of composite web 48 will be in contact with a release web surface which is substantially flat with a rough texture. This may be accomplished by sandwiching composite web 48 between the substantially flat and textured surfaces of two release webs 54 and 55 during the winding step, as shown in FIG. 6. More desirable, however, are processes which employ a single release web in which both surfaces are substantially flat with a rough texture. In such processes, one surface of composite web 48 will conform to the corresponding surface of release web 54 in laminate 74, while the other surface of composite web 48 will conform to the opposite surface of release web 54 as laminate 74 is wound around mandrel 76.

By substantially following the process as described above, a spiral band 90 having a plurality of concentric convolutions of a high tensile strength composite is formed. Referring to FIG. 3, spiral band 90 includes an innermost convolution having an inner end 96, an outermost convolution having an outer end 98, and intermediate convolutions.

The composite desirably includes a continuous phase of a cured resin matrix encapsulating a large plurality of continuous fibers of a high tensile strength material oriented codirectionally with one another in the spiral direction. Although the codirectional fibers are generally indicated by parallel longitudinal lines 100 in FIG. 3, each space between adjacent parallel lines 100 actually represents hundreds or thousands of longitudinal fibers. The convolutions of spiral band 90 have an elastic memory, which means that a force can be used to uncoil the band, but that once this force is removed the band will return to its initial spiral configuration. The elasticity of the convolutions is preferably such that the band is biased into the spiral configuration with a force greater than the weight of the band so that the band will remain in the spiral configuration when suspended by outer end 98. Notably, the surfaces of the band will not have undulations, but rather at least one surface of the band will be substantially flat. Preferably, both surfaces of the band will be substantially flat, as shown in FIG. 2. Highly preferred bands will have a surface flatness which deviates by no more than 1/64 inches per foot in transverse cross-section, and will have a surface waviness (i.e., surface undulations) which does not exceed 0.003 inches. Further, the surfaces of highly preferred bands will have a textured surface of about 12.5 microinches nominal as measured using a profilometer.

Figure 7:
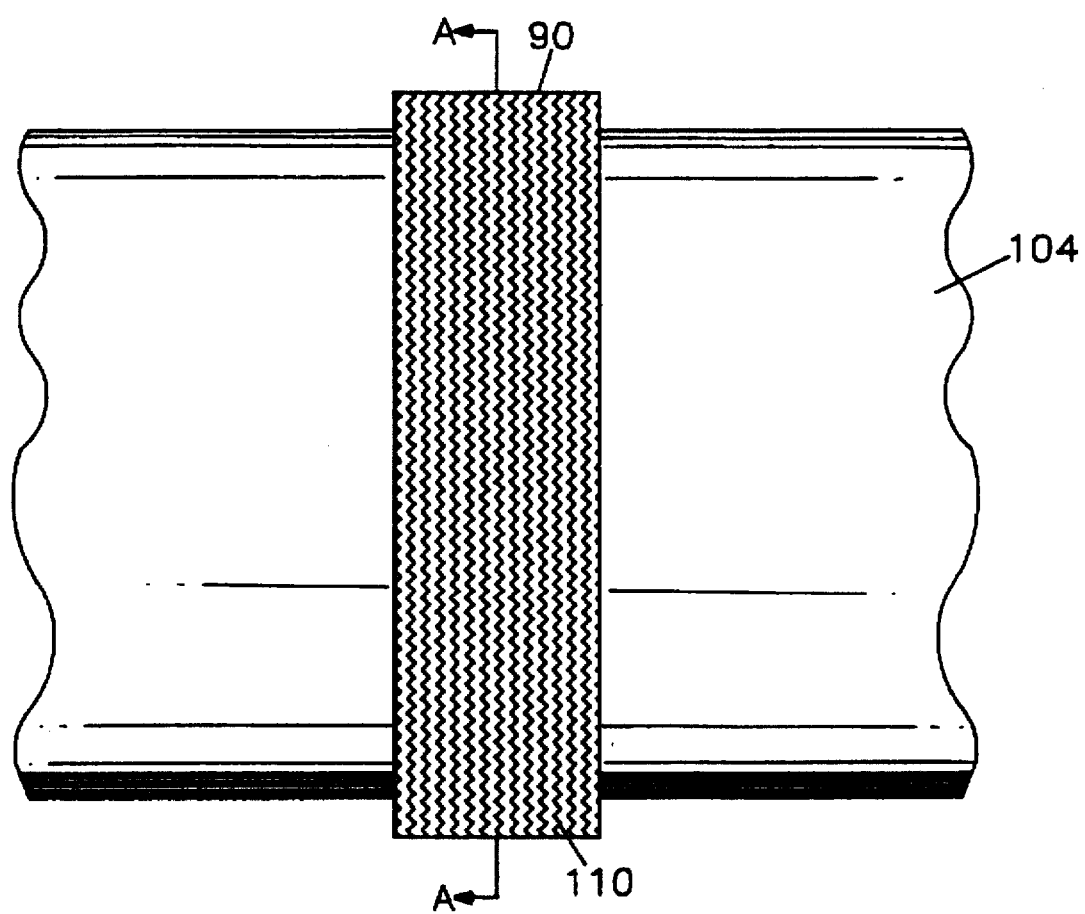
FIG. 7 is a fragmentary front view of a structure reinforced with a spiral band according to one embodiment of the present invention.
Figure 8:
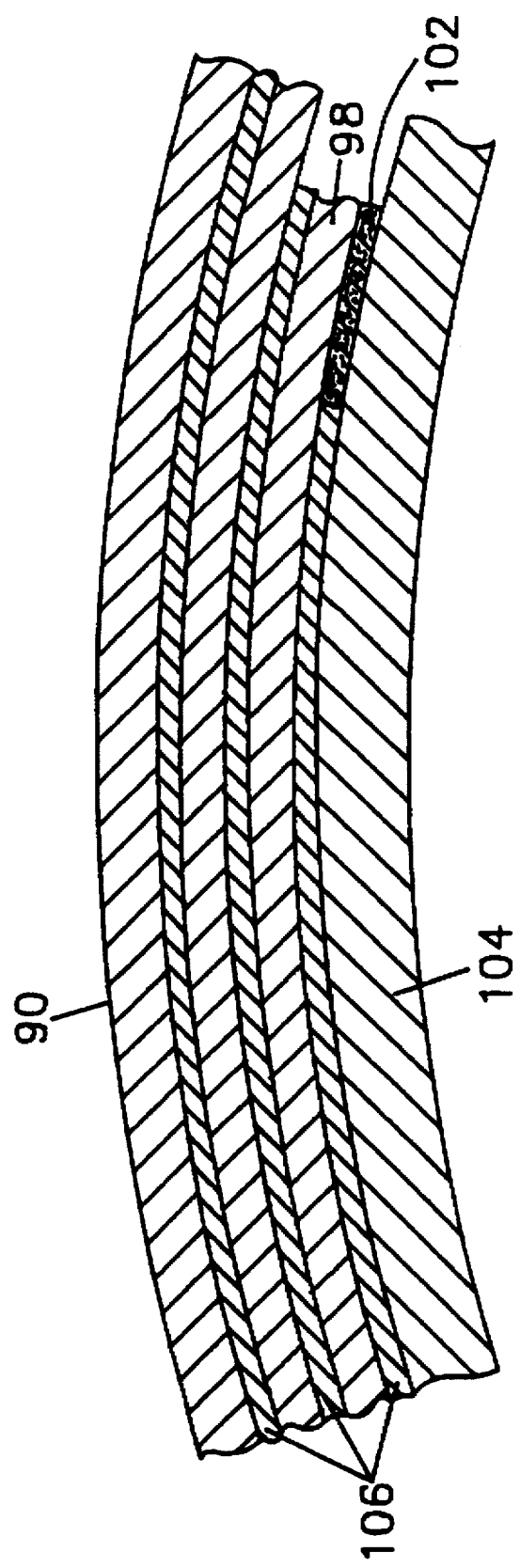
FIG. 8 is a schematic transverse cross-sectional view taken along line A—A of FIG. 7.

The spiral bands formed by the above-described process may be used for reinforcing axially extending structures against failure from internal forces. Such structures may include, for instance, pipelines carrying fluids under pressure, storage, drums, high pressure storage cannisters, reinforced concrete bridge supports, and other structures which can be evaluated in terms of an axially extending structure having an internal force directed radially outward therefrom. In applications where the structure is subject to significant internal pressures, Such as gas transmission pipelines, one or more Spiral bands 90 may be found around the structure so that the convolutions of the band are arranged concentrically. Referring to FIGS. 7 and 8, this reinforcement technique includes the initial step of attaching an adhesive pad 102 to the exterior surface of the structure 104. One such suitable adhesive pad 102, for example, may be a rectangularly shaped closed cell vinyl pad having a contact adhesive on both sides. Optionally, a layer of a suitable adhesive 106 may be applied to a peripheral surface of structure 104 prior to the installation of spiral band 90. The spiral band 90 is initially applied to structure 104 by adhering outer end 98 to adhesive pad 102 so that the spiral band 90 is oriented essentially perpendicular to the axial direction of the structure. With outer end 98 held in place, the spiral band 90 may be installed by simultaneously uncoiling the spiral and winding the band around structure 104. After the first convolution has been applied to structure 104, the outer surface of the convolution is coated with adhesive 106 and the spiral band 90 is again wound around the structure to form the next convolution. The outer surface of this next convolution is coated with the adhesive 106 and still another convolution is formed, the process continuing until, as shown in FIG. 7, the entirety of spiral band 90 has been applied to structure 104 to form a coil 110 thereabout, wherein the inner end 96 of the band 90 is brought into contact with the underlying convolution of the coil 110. Coil 110 will preferably include at least 5 convolutions, and more preferably about 8 convolutions, of spiral band 90.

Suitable adhesives for use in the installation of spiral bands 90 are disclosed in U.S. patent application Ser. No. 07/942,731, entitled "Methods For Repairing Pipe", which application was filed simultaneously herewith, naming Messrs. Fawley, Schmidt, Block, Kelty and Briggs as inventors. The disclosure of this reference is incorporated by reference herein. Briefly, these adhesives will generally have an initial fluid state in which they have an appropriate viscosity for easy application and adherence, and, after installation has been completed, will cure to a harder, more strongly adhesive state. Preferably, the adhesives in the cured state will be resistant to degradation from environmental exposure over long periods of time. A particularly preferred adhesive in this regard includes a methyl methacrylate base component and a peroxide catalyst for curing the base component, the components being mixed in a suitable ratio to provide the adhesive with an adequate cure time to complete the installation process.

As the convolutions of spiral band 90 are wrapped around structure 104, the elasticity of the composite will cause the convolutions to tighten somewhat upon themselves and upon the outer surface of the structure. Desirably, once the entirety of spiral band 90 has been installed, the convolutions are radially aligned with one another by tapping on the side edges with a block or the like until the edges on each side of coil 110 are in substantial alignment with one another. This alignment is easily accomplished since the convolutions of spiral band 90 do not include surface undulations which may mesh together and restrict transverse movement. The convolutions of coil 110 may then be tightened further by mechanical means until the innermost convolution of coil 110 is in intimate contact with the outer surface of structure 104. During this tightening process, the layer of adhesive 106 between adjacent convolutions, still in an uncured fluid state, acts as a lubricant to facilitate the tightening of the convolutions. As the convolutions of coil 110 are tightened, excess adhesive is squeezed out from between the convolutions as the convolutions come closer and closer together. Because of the substantially planar surfaces of spiral band 90, the confronting surfaces of adjacent convolutions are able to approach one another closely so that only a small film of adhesive 106 lies between these surfaces. As a result, strong adhesive bonds will be created to bond adjacent convolutions of coil 110 together securely. Moreover, the textured surface of the spiral band 90 will enhance the adherence of the adhesive to the convolutions of the band. It is not necessary to coat the final convolution of coil 110 with adhesive 106. One or more strips of tape, for example, fiber tape, may be placed around the coil 110 to hold the coil tightly in place until the adhesive 106 between the convolutions cures to a sufficiently adhesive state.

Figure 9:
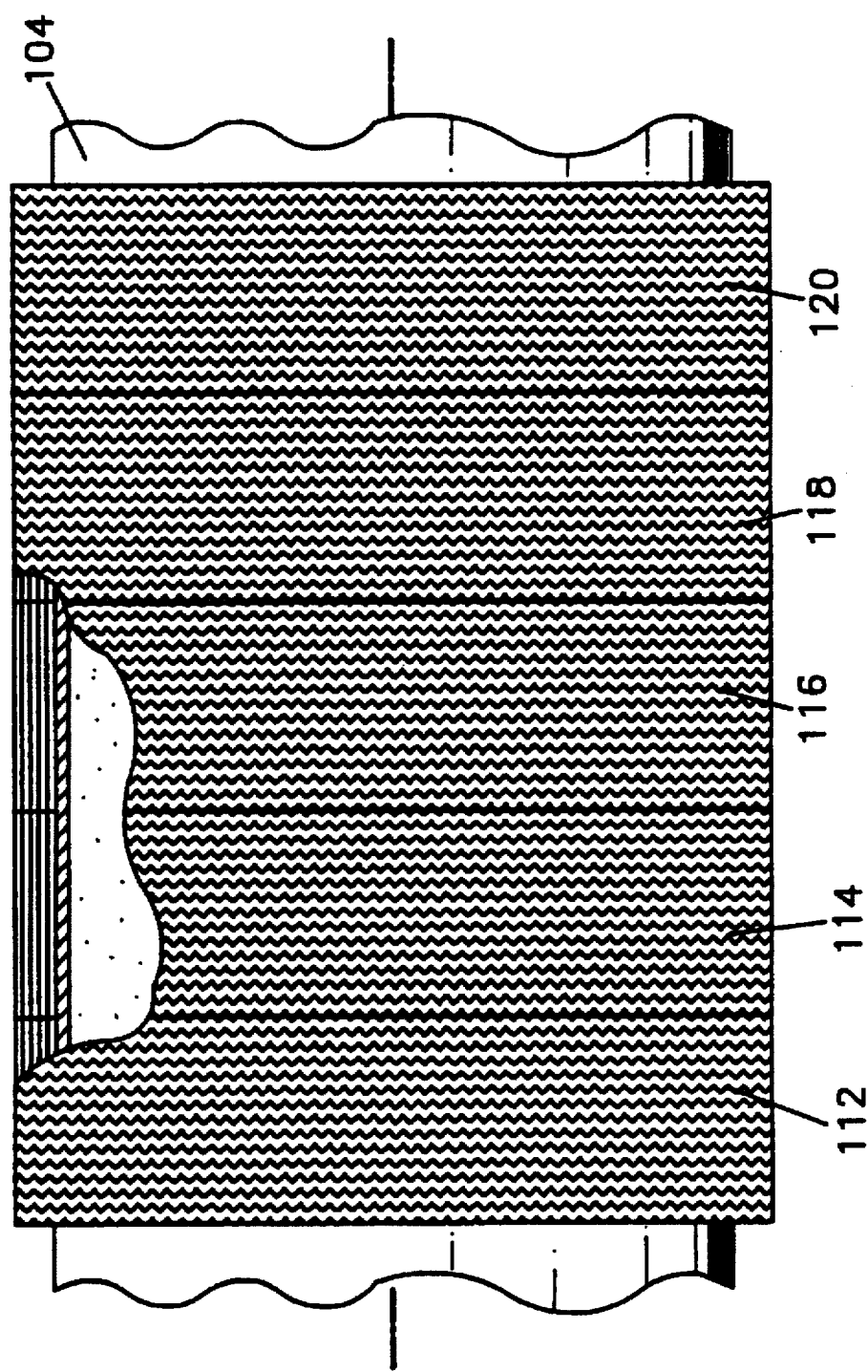
FIG. 9 is a schematic fragmentary front view of a structure on which a plurality of spiral bands according to the present invention have been installed to provide reinforcement, portions of some of the bands being cut away.

In certain applications, it may be desirable to reinforce an axial length of a structure which is greater than the width of a single spiral band 90. In such event, illustrated in FIG. 9, a number of spiral bands 90 may be installed on the structure to form a plurality of coils 112, 114, 116, 118 and 120 which cover an appropriate axial length of the structure. Each of coils 112-120 may be formed as described in connection with the formation of coil 110. Although coils 112-120 are shown as abutting one another in edge-to-edge fashion, actual contact of one coil with the next may not be necessary. Rather, the structure may be adequately reinforced with coils 112-120 installed with small gaps therebetween.

Figure 10:
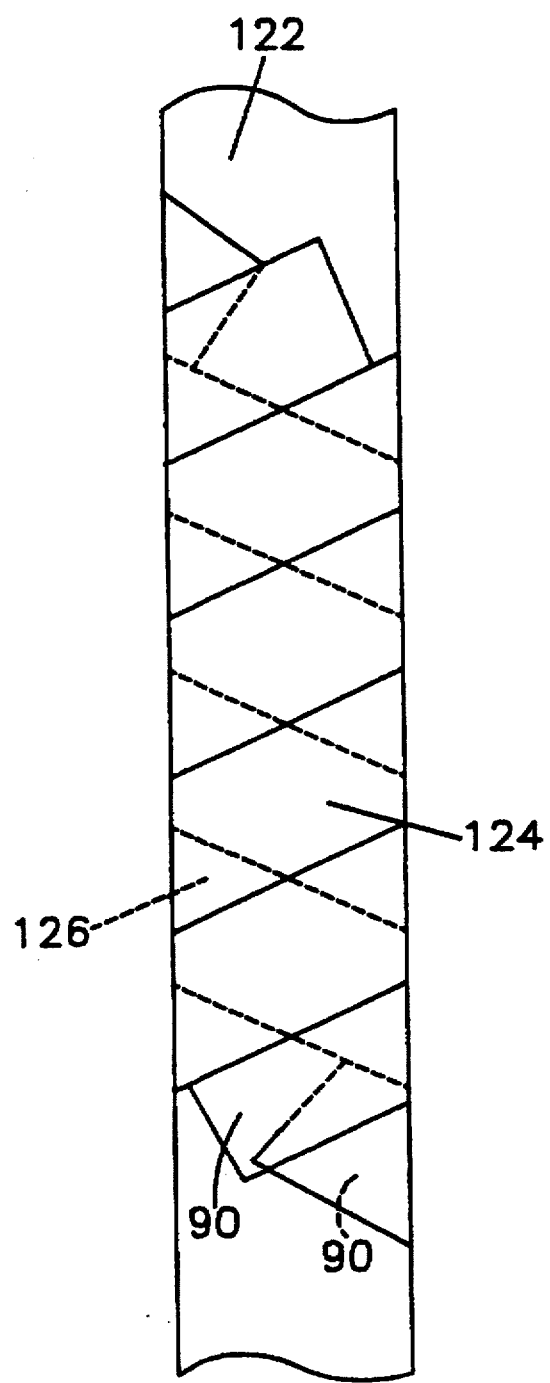
FIG. 10 is a fragmentary front view of a structure on which a plurality of spiral bands according to the present invention have been installed to provide reinforcement in accordance with another embodiment of the present invention.

In those situations where the internal pressure within the structure is significantly less than that found in gas transmission pipelines, the demands on the reinforcement will not be as great. Such is the case in the reinforcement of bridge supports formed from reinforced concrete. To reinforce such structures, one or more spiral bands 90 may be wound around the structure in opposite helical directions, as illustrated in FIG. 10. As with the technique for reinforcing structure 104 discussed above, an adhesive pad (not shown) similar to adhesive pad 102 is employed to initially adhere outer end 98 of spiral band 90 at an oblique angle to the structure 122. After a layer of an adhesive (such as adhesive 106) has been applied to the outer surface of structure 122, a spiral band 90 may be simultaneously uncoiled and wound around the structure in a helical pattern, with each convolution of band 90 lying adjacent the previous convolution, to form a first helical coil 124. If desired, after the entirety of spiral band 90 has been applied to structure 122, a second spiral band 90 may be applied thereover in the same fashion. Thus, after a second adhesive pad has been attached to helical coil 124 and a layer of adhesive has been applied thereover, a second spiral band 90 may be installed to cover the first helical coil 124. Typically, the second spiral band 90 will be installed to form a helical coil 126 in which the individual helical convolutions are oriented in the opposite direction of the helical convolutions in coil 124. Additional spiral bands may be installed to form further helical coil layers as needed. Again, the planar surfaces of spiral band 90 enable the band to be installed on structure 122 so that only a thin film of adhesive lies between helical coil 124 and the outer surface of structure 122, and between helical coil 126 and helical coil 124. By limiting the adhesive to a thin film, strong adhesive bonds are developed between these components.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Moreover, it will be understood that it is intended that the present invention cover various combinations of the features described herein in addition to those specifically set forth in the appended claims.

We claim:

1. A method of reinforcing an axially extending structure against an internal force directed radially outward from said structure, said method comprising the steps of:

providing a spiral band having a plurality of convolutions of a high tensile strength composite material, each one of said convolutions having at least one surface that is substantially flat in transverse cross-section, said composite material including a multiplicity of continuous, high tensile strength filaments substantially completely encapsulated in a resin matrix and not interconnected by cross-threads, said filaments extending codirectionally with one another through said resin matrix, wrapping said plurality of convolutions of said spiral band about said structure, simultaneous with said wrapping step, applying a layer of an adhesive between adjacent ones of said plurality of convolutions.

2. The method as claimed in claim 1, wherein said band of composite material comprises a plurality of elastic convolutions having a coiled configuration in a relaxed condition and said wrapping step includes the steps of deflecting portions of said band to an uncoiled configuration and maneuvering said portions of said band around said structure, wherein said portions of said band will move toward said relaxed condition to tighten about said structure.

3. The method as claimed in claim 1, further comprising the steps of adjusting said convolutions so that said plurality of convolutions are in radial alignment with respect to one another.

4. A method of reinforcing an axially extending structure having an internal force directed radially outward from said structure, said method comprising steps of:

providing a band of composite material defining a spiral terminating in an inner end and an outer end and having a plurality of elastic convolutions for encircling and engaging said structure, each convolution having an inner surface and an outer surface bearing against corresponding surfaces of adjacent convolutions, at least one of said inner and outer surfaces of each of said convolutions having a surface that is substantially flat in transverse cross-section, said composite material comprising a plurality of continuous, high tensile strength filaments substantially completely encapsulated in a resin matrix and not interconnected by cross-threads, said filaments extending through said spiral parallel to the direction of spiral, wrapping said band of composite material about said axially extending structure, and simultaneous with said wrapping step, applying a layer of an adhesive between adjacent ones of said plurality of convolutions.

5. A method of reinforcing an axially extending structure against an internal force directed radially outward from said structure, said method comprising the steps of:

providing at least one band having a plurality of convolutions of a composite material, each one of said convolutions having at least one surface that is substantially flat in transverse cross-section, said composite material including a multiplicity of continuous, high tensile strength filaments substantially completely encapsulated in a resin matrix and not interconnected by cross-threads, said filaments extending codirectionally with one another through said resin matrix, installing said at least one band of composite material about said structure to form overlying layers of said composite material about said structure, and securing an outermost one of said layers to at least one underlying one of said layers.

6. The method as claimed in claim 5, wherein said at least one band of composite material defines a spiral terminating in an inner end and an outer end and having a plurality of elastic convolutions for encircling and engaging said structure, each convolution having an inner surface and an outer surface in contact with corresponding surfaces of adjacent convolutions, and said installing step includes the step of wrapping said plurality of convolutions about said structure to form a coil thereabout.

7. The method as claimed in claim 6, wherein the elasticity of said convolutions biases said band into said spiral with a force greater than the weight of said band, whereby said band remains in said spiral when suspended by said outer end of said spiral.

8. The method as claimed in claim 5, wherein said installing step includes the step of installing a plurality of bands of a composite material about said structure.

* * * * *

UNITED STATES PATENT AND TRADEMARK OFFICE
CERTIFICATE OF CORRECTION

PATENT NO. : 5,683,530
DATED : November 4, 1997
INVENTOR(S) : Fawley et al.

It is certified that error appears in the above-identified patent and that said Letters Patent is hereby corrected as shown below:

Column 1, line 19, "Under" should read -- under --.

Column 1, line 41, "Suffered" should read -- suffered --.

Column 4, line 40, "adhesive keep" should read -- adhesive to keep --.

Column 9, line 38, "substantially planar" should read -- substantially flat --.

Column 10, line 31, "storage, drums" should read -- storage drums --.

Column 10, line 36, "Such" should read -- such --.

Column 10, line 37, "Spiral bands" should read -- spiral bands --.

Column 11, line 36, "substantially planar" should read -- substantially flat --.

Column 12, line 8, "Uncoiled" should read -- uncoiled --.

Column 12, line 21, "the planar surfaces" should read -- the flat surfaces --.

Column 12, line 32, "be/understood" should read -- be understood --.

Signed and Sealed this

Seventeenth Day of March, 1998

Attest:

BRUCE LEHMAN

Attesting Officer

Commissioner of Patents and Trademarks